(12) United States Patent
Lassen (10) Patent No.: US 10,942,492 B2
(45) Date of Patent: Mar. 9, 2021

(54) AUTONOMOUS PROCESS CONTROL PERIPHERAL

(71) Applicant: Atmel Corporation, Chandler, AZ (US)

(72) Inventor: Jacob Lunn Lassen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 15/793,924

(22) Filed: Oct. 25, 2017

(65) Prior Publication Data

US 2018/0188699 A1 Jul. 5, 2018

Related U.S. Application Data

(60) Provisional application No. 62/442,922, filed on Jan. 5, 2017.

(51) Int. Cl.
*G05B 11/42* (2006.01)
*G05B 13/02* (2006.01)
*G05B 19/18* (2006.01)

(52) U.S. Cl.
CPC ............ *G05B 11/42* (2013.01); *G05B 13/024* (2013.01); *G05B 19/18* (2013.01)

(58) Field of Classification Search
None
See application file for complete search history.

(56) References Cited

U.S. PATENT DOCUMENTS

| 5,450,346 | A | * | 9/1995 | Krummen | ............ | G05B 19/058 |
| | | | | | | 700/11 |
| 5,867,384 | A | * | 2/1999 | Drees | ........................ | G05B 5/01 |
| | | | | | | 700/42 |
| 9,729,639 | B2 | * | 8/2017 | Sustaeta | ............. | G05B 13/0285 |
| 9,772,633 | B2 | * | 9/2017 | Bouhal | .................. | G05B 11/42 |
| 10,001,764 | B2 | * | 6/2018 | Britt | ..................... | G05B 19/042 |

OTHER PUBLICATIONS

Microchip, "DS70000657H.pdf", 2013, Microchip Technology Inc., pp. 1, 141, 216 http://ww1.microchip.com/downloads/en/DeviceDoc/70000657H.pdf (Year: 2013).*

* cited by examiner

*Primary Examiner* — Mohammad Ali
*Assistant Examiner* — David Earl Ogg
(74) *Attorney, Agent, or Firm* — TraskBritt (57) ABSTRACT

An updated process parameter to an autonomous process control peripheral is autonomously obtained when made available by a process monitor peripheral, such as an analog-to-digital converter (ADC). The input can be obtained in response to a system event, such as a completed ADC conversion. The autonomous process control peripheral can compute an updated control variable each time the process variable is updated. When the updated control variable is calculated by the autonomous process control peripheral, the updated control variable is autonomously transferred or otherwise made available (e.g., through a register) by the autonomous process control peripheral to a process actuate peripheral. The process actuate peripheral uses the updated control variable to adjust the process being controlled.

20 Claims, 6 Drawing Sheets

AUTONOMOUS PROCESS CONTROL PERIPHERAL

CROSS-REFERENCE TO RELATED APPLICATION

This application claims priority to U.S. Provisional Application No. 62/442,922, filed Jan. 5, 2017, the entire contents of which are incorporated herein by reference.

TECHNICAL FIELD

The subject matter of this disclosure relates generally to embedded systems.

BACKGROUND

A proportional-integral-derivative (PID) controller is a control loop feedback mechanism commonly used in industrial control systems. A PID controller continuously calculates an error value as the difference between a desired set point and a measured process variable. Most control systems use PID controllers to regulate a system output to match a desired output. For example, the speed of a motor can be regulated to run at constant speed regardless of the load on the motor. PID controllers are typically implemented in software in a microcontroller unit (MCU) or a digital signal processor (DSP), depending on the application. As embedded systems become more complex, however, the number of real time tasks to be handled by the MCU or DSP controller have also increased. This increase in real time tasks poses a challenge for the embedded system engineer, as missing a communication time slot, not collecting a sample from an analog-to-digital converter (ADC) or "glitching" on a pulse width modulation (PWM) output can have serious consequences in an application.

SUMMARY

Various embodiments are disclosed for an autonomous process control peripheral for use in, for example, a microcontroller system.

In an embodiment, a system comprises: at least one bus; a central processing unit (CPU) coupled to the at least one bus; a process monitor peripheral coupled to the at least one bus; a process actuate peripheral coupled to the at least one bus; an autonomous process control peripheral coupled to the at least one bus, the autonomous process control peripheral operable, without intervention by the CPU, to: obtain a first signal indicating that a variable of a process monitored by the process monitor peripheral is available; obtain the process variable from the process monitor peripheral; update a control variable using a control law; and provide the updated control variable to the process actuate peripheral to adjust the process.

In an embodiment, a method comprises: obtaining, by an autonomous process control peripheral of a microprocessor system, a first signal indicating that a variable of a process monitored by a process monitor peripheral is available; obtaining, by the autonomous controller, the process variable from the process monitor peripheral; updating, by the autonomous process control peripheral the control variable using a control law; and providing, by the autonomous process control peripheral, the updated control variable to a process actuate peripheral for adjusting the process.

DETAILED DESCRIPTION

An updated process parameter to an autonomous process control peripheral (APCP) is autonomously obtained when made available by a process monitor peripheral, such as an analog-to-digital converter (ADC). The input can be obtained in response to a system event, such as a completed ADC conversion. The APCP can compute an updated control variable each time the process variable is updated. When the updated control variable is calculated by the APCP, the updated control variable is autonomously transferred or otherwise made available (e.g., through a register) by the APCP to a process actuate peripheral. The process actuate peripheral uses the updated control variable to adjust the process being controlled. In an embodiment, a notification signal is generated by the APCP to notify the process actuate peripheral that an updated control variable is available or has been transferred. In an embodiment, the APCP is implemented as a dedicated hardware peripheral module embedded in a microcontroller system or other system, that receives and generates events, obtains and passes data, and implements a control law (e.g., a PID control law) to compute a result that can be shared with other peripheral modules. In another embodiment, the APCP includes circuitry for implementing direct memory access (DMA) functionality that can be triggered by DMA signals over a DMA channel managed by a DMA controller (DMAC).

Example PID Controller

Figure 1:
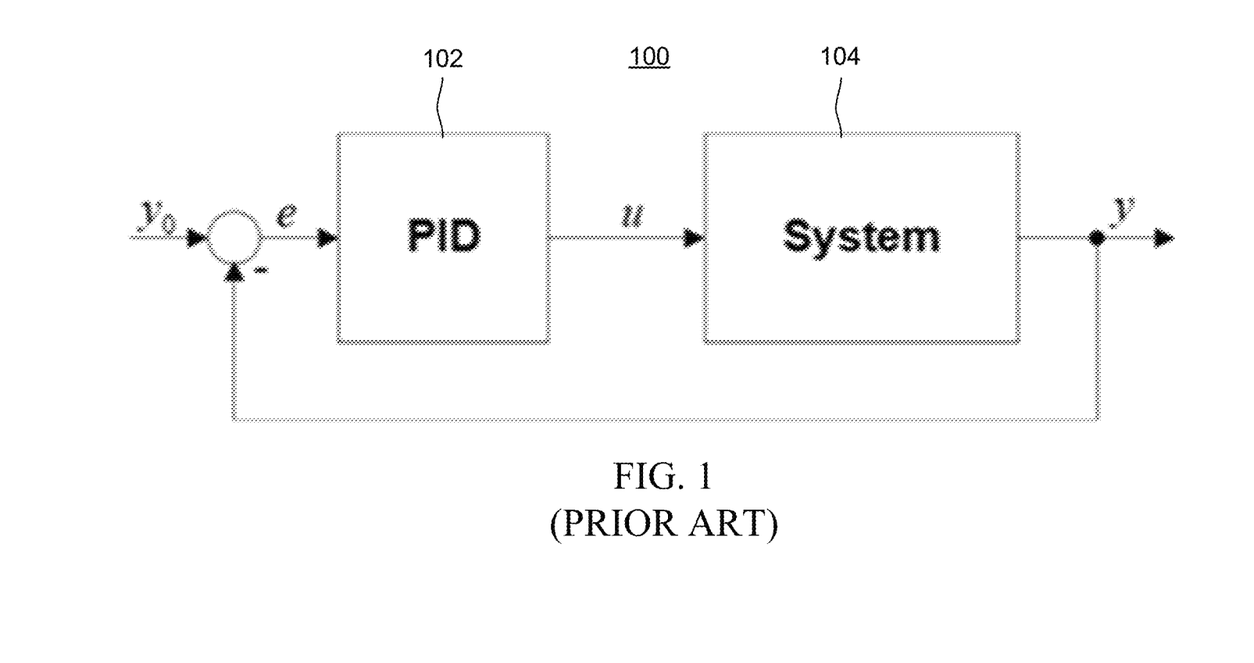
FIG. 1 is a block diagram illustrating a conventional control loop that includes a PID controller, according to an embodiment.

FIG. 1 is a block diagram illustrating a conventional control loop that includes a PID controller, according to an embodiment. PID controller 100 continuously calculates an error value e(t) as the difference between a desired setpoint $y_0$ and a measured process variable y(t). PID controller 100 attempts to minimize the error over time e(t) by updating a control variable u(t), such as the position of a control valve, a damper, or the current supplied to a heating element or an electric motor. In the example shown, PID 102 adjusts the control variable u(t) based on proportional (P), integral (I), and derivative (D) terms, where u(t) is given (using the continuous formulation) by:

$$u(t) = K_p e(t) + K_i \int_0^t e(\tau)d\tau + K_d \frac{de(t)}{dt}, \qquad [1]$$

where $K_p$, $K_i$, and $K_d$ are the coefficients for the P, I and D terms, respectively. The P term accounts for current values of the error. For example, if the error is large and positive, the control output will also be large and positive. The I term accounts for past values of the error. For example, if the control output is not sufficiently strong, the integral of the error will accumulate over time, and the controller will respond by applying a stronger action. The D term accounts for possible future trends of the error, based on its current rate of change. PID controller 100 can be implemented in software or a digital signal processor (DSP), depending on the application. If implemented in a DSP, Equation [1] can be discretized using discretization methods known in the art.

As the number of real time tasks to be handled by the MCU or DSP implementing a software PID controller increases, the PID controller may start to incur errors, such as missing a communication time slot, not collecting a sample from an ADC or "glitching" on a PWM output (e.g., missing a pulse in the PWM output). To reduce the likelihood of an error, an APCP can be implemented in hardware, as described in reference to FIG. 2.

Example Microcontroller System

Figure 2:
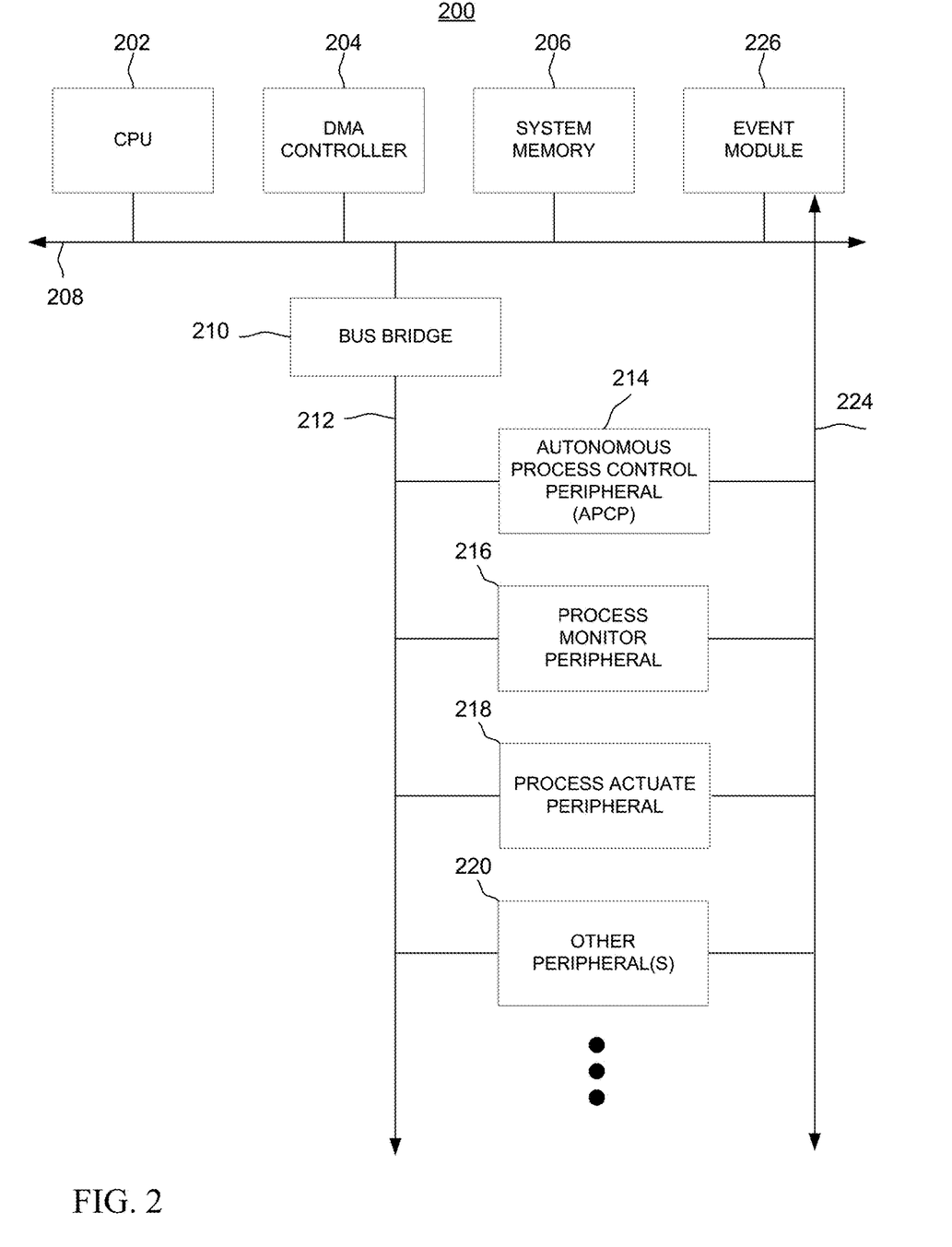
FIG. 2 is a block diagram of an example microcontroller system that includes an autonomous process control peripheral, according to an embodiment.

FIG. 2 is a block diagram of an example microcontroller system that includes an APCP, according to an embodiment. Microcontroller system 200 includes CPU 202, DMA controller (DMAC) 204, system memory 206 and event module 226, each coupled to system bus 208. Additionally, bus bridge 210 connects system bus 208 to peripheral bus 212. Peripheral bus 212 is further coupled to autonomous process control peripheral (APCP) 214, process monitor peripheral module 216, process actuate peripheral 218 and one or more other peripherals 220. One or more other peripherals 220 include but are not limited to: an ADC, a digital-to-analog converter (DAC), an analog comparator, a capture timer module, a PWM timer module, one or more input/output (I/O) interface modules (e.g., I2C, SPI, UART interface modules) and any other peripheral type. Microcontroller system 200 is an example of a system that embeds a single APCP 214. It is noted, however, that one or more APCPs can be embedded in any desired system or device.

In an embodiment, peripherals 214, 216, 220 are also coupled to event channels 224, which are coupled to event module 226. In this embodiment, the peripherals within microcontroller system 200 are capable of generating two types of actions in response to given stimulus; set a register flag for later intervention by CPU 202 (using interrupt or polling methods), or generate event signals, which can be internally routed directly to other peripherals within microcontroller system 200. The use of events allows for direct actions to be performed in one peripheral in response to a stimulus in another without intervention by CPU 202. The use of event signaling can lower the overall power consumption of microcontroller system 200 if CPU 202 is able to remain in sleep modes for longer periods, and lowers the latency of the system response. In an embodiment, the event system is comprised of a number of freely configurable event resources, plus a number of fixed event users. Each event resource can be configured to select the input peripheral that will generate the events signal, as well as the synchronization path and edge detection mode. The fixed-function event users, connected to peripherals within microcontroller system 200, can then subscribe to an event resource in a one-to-many relationship to receive events as they are generated. There are many different events that can be routed in microcontroller system 200, which can then trigger many different actions. For example, an analog comparator peripheral could be configured to generate an event when the input signal rises above the compare threshold, which then triggers a timer counter peripheral to capture the current count value for later use.

An event module in microcontroller system 200 includes event channels 224, which can be freely linked to an event generator (e.g., a peripheral within microcontroller system 200 that is capable of generating events). Event module 226 is an example even generator that is coupled to system bus 208 and generates event signals for CPU 202 and system memory 206, for example. Each event channel can be individually configured to select the generator peripheral, signal path, and edge detection applied to the input event signal, before being passed to any event user(s). Event channels can support multiple users within microcontroller system 200 in a standardized manner; when an event user is linked to an event channel, the event channel will automatically handshake with all attached users to ensure that all peripherals correctly receive and acknowledge the event. Event users are able to subscribe to an event channel after it has been configured. Each event user includes a fixed connection to one of the peripherals within microcontroller system 200 (e.g., an ADC module or timer module) and is capable of being connected to a single event channel.

In microcontroller system 200, CPU 202 is offloaded by implementing hardware APCP 214 that can operate autonomously of CPU 202 (e.g., without intervention by CPU 202). APCP 214 takes a set point and a process variable, calculates the error between the setpoint and the process variable and then calculates a control variable to reduce the error. Because APCP 214 is implemented in hardware, rather than software like conventional solutions, APCP 214 offloads CPU 202 from performing the computation of the control variable. To make the APCP 214 autonomous from CPU 202, the inputs to APCP 214 are autonomously obtained by APCP 214 when an updated input (e.g., the process parameter) becomes available from process monitor peripheral 216 (e.g., from an ADC module). In an embodiment, the obtaining of a new process parameter can be triggered by an event signal transmitted on one of event channels 224, such as an ADC event generated by an ADC module. In response to the event signal, APCP 214 computes an updated control variable each time the updated process variable (or setpoint) is updated. When an updated control variable is calculated by APCP 214, the updated control variable is autonomously transferred or otherwise made available to process actuate peripheral 218, which then uses the control variable to adjust the process. In an embodiment, a notification signal is generated by APCP 214 to notify process actuate module 218 that new data has been transferred or is otherwise available. In an embodiment, APCP 214 can be implemented as a dedicated hardware peripheral module that receives and generates event signals on an event channel, fetches and passes through data, and implements a control law (e.g., implements a PID algorithm) to compute an updated control variable. In another embodiment, APCP 214 can include circuitry that implements DMA functionality, which can be triggered by DMA signal over a DMA channel managed by DMAC 204.

Example Autonomous PID Controller Peripheral

Figure 3:
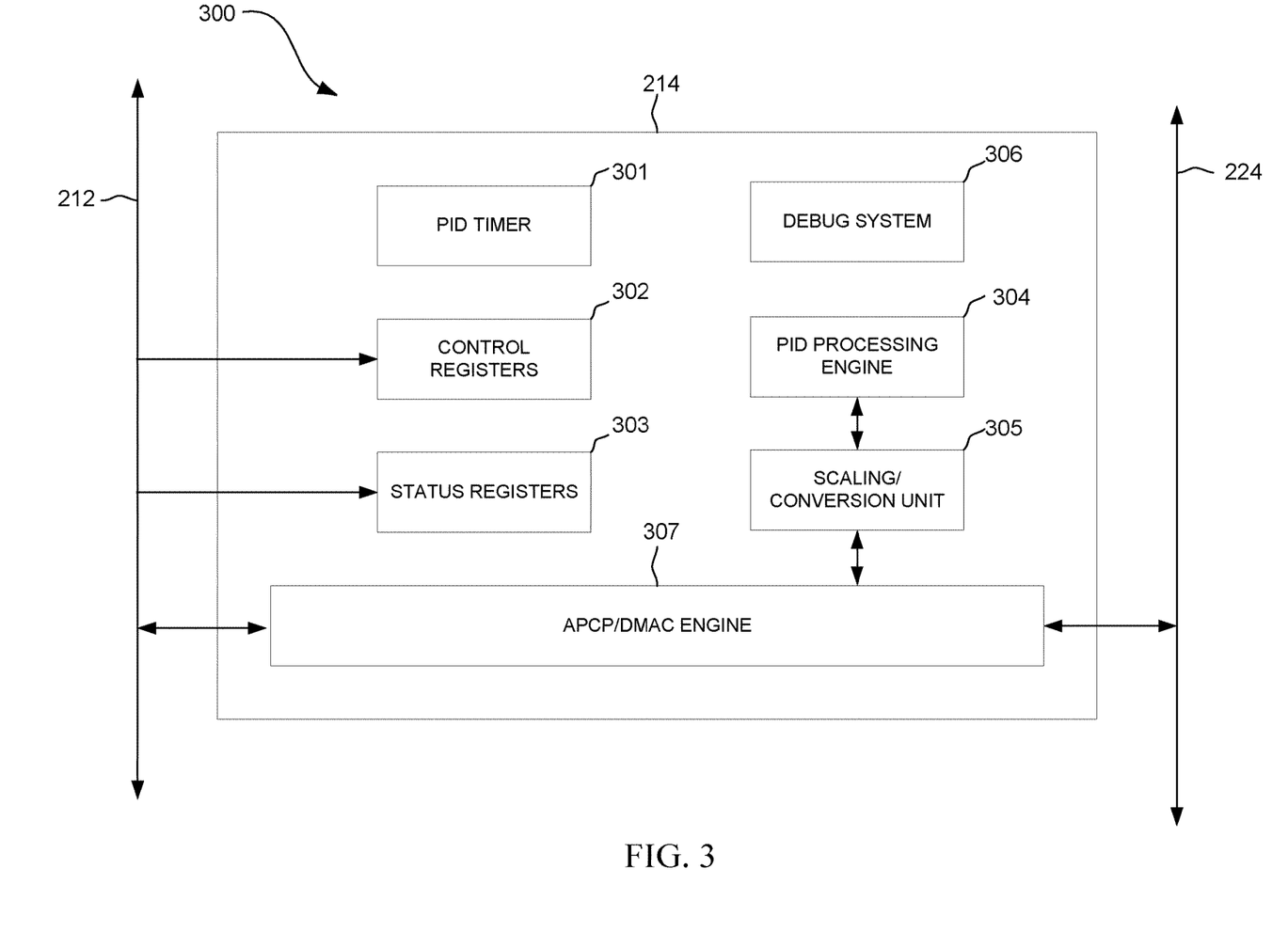
FIG. 3 is a block diagram of the example autonomous process control peripheral shown in FIG. 2, according to an embodiment.

FIG. 3 is a block diagram of the example APCP 214 shown in FIG. 2, according to an embodiment. APCP 214 can include PID timer 301, control register(s) 302, status register(s) 303, PID processing engine 304, scaling/conversion unit 305, debug system 306 and APCP/DMAC engine 307. APCP 214 is coupled to peripheral bus 212 and event channels 224, as previously described in reference to FIG. 2.

PID timer 301 is operable to control the timing of various tasks performed by APCP 214. For example, APCP 214 can provide one or more clocks for use with various circuits (e.g., logic) in APCP 214 to receive inputs and generate outputs with a fixed frequency and to ensure a stable control process (e.g., a time-invariable control process). In another embodiment, the control loop performed by APCP 214 can be timed by an event signal from timer module 222 (not shown) or other timer or clock source outside APCP 214. Control register(s) 302 are coupled to peripheral bus 212 and operable to receive and store control variables from peripheral bus 212 for controlling APCP 214 (e.g., PID terms). Status register(s) 303 are coupled to peripheral bus 212 and operable to receive status variables from other peripheral modules indicating, for example, the status of a particular task being performed by the peripheral module (e.g., status of an ADC event). Scaling/conversion unit 305 is operable to scale/convert inputs (e.g., setpoint, process variables) and output (e.g., control variable) of APCP 214 to ensure that the proper units are used for the control process and for the process being controlled. PID processing engine 304 is operable to implement a PID control law. For example, PID processing engine 304 is operable to implement at least some portions of Equation [1] and provide an updated control variable to scaling/conversion unit 305. PID processing engine 304 may have a different gain for positive and negative errors due to the response time of the process being controlled. For example, if the process actuate peripheral 218 is coupled to an electric motor, the electric motor may accelerate faster than it deaccelerates. APCP/DMAC engine 307 is coupled to peripheral bus 212 and event channels 224 and operable to autonomously obtain inputs for APCP 214 from other peripherals (e.g., setpoint and process variable, event signals) and also implement DMA functionality, including circuitry for receiving and processing DMA signals received and transmitted over DMA channels. Debug system 306 is operable to allow control of APCP 214 by an external debugger for testing.

Example Process Flows

The process flows described below are performed by the APCP module 214 in series or in parallel depending on the process being controlled. The APCP processes can be implemented by system 300, as described in reference to FIG. 3.

Figure 4:
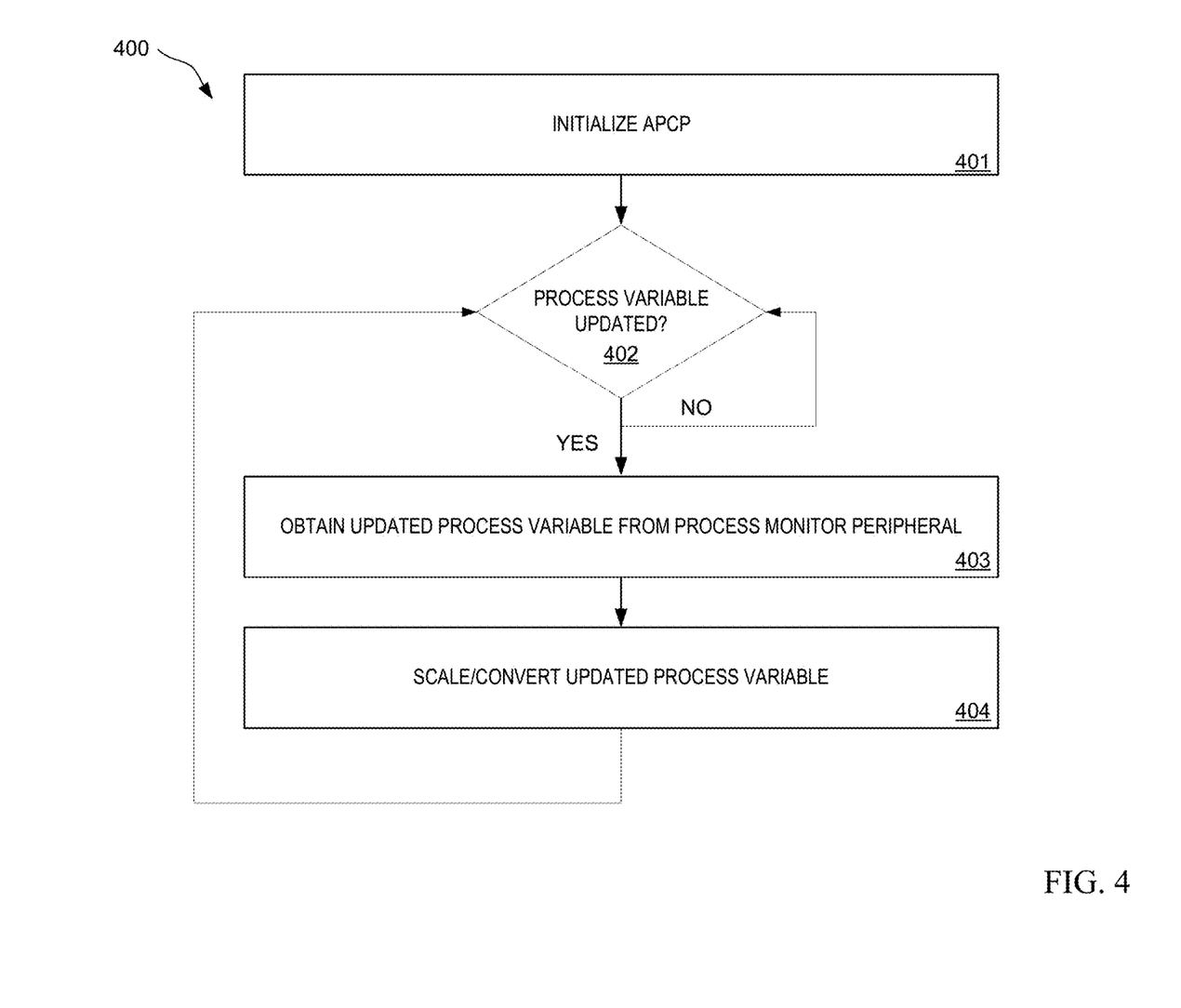
FIG. 4 is an example process flow for autonomous update of a process variable, according to an embodiment.

FIG. 4 is an example process flow for autonomous update of a process variable, according to an embodiment. Process 400 can begin by initializing the APCP (401). For example, control register(s) 302 can be loaded with various control values for the control loop. Some examples of control values are the coefficients $K_p$, $K_i$, and $K_d$ for PID terms of a PID control law.

Process 400 can continue by determining if the process variable is updated (402). For example, a process monitor peripheral can signal to the APCP that the process variable is updated. If the process variable is updated, process 400 obtains the updated process variable (403) from, for example, a register in the process monitoring peripheral or receives it from the peripheral bus, and then scales/converts the new process variable as required by the process (404). If the process variable is not updated, process 400 continues the determining step 402 until the process variable is updated or the APCP is deactivated.

Figure 5:
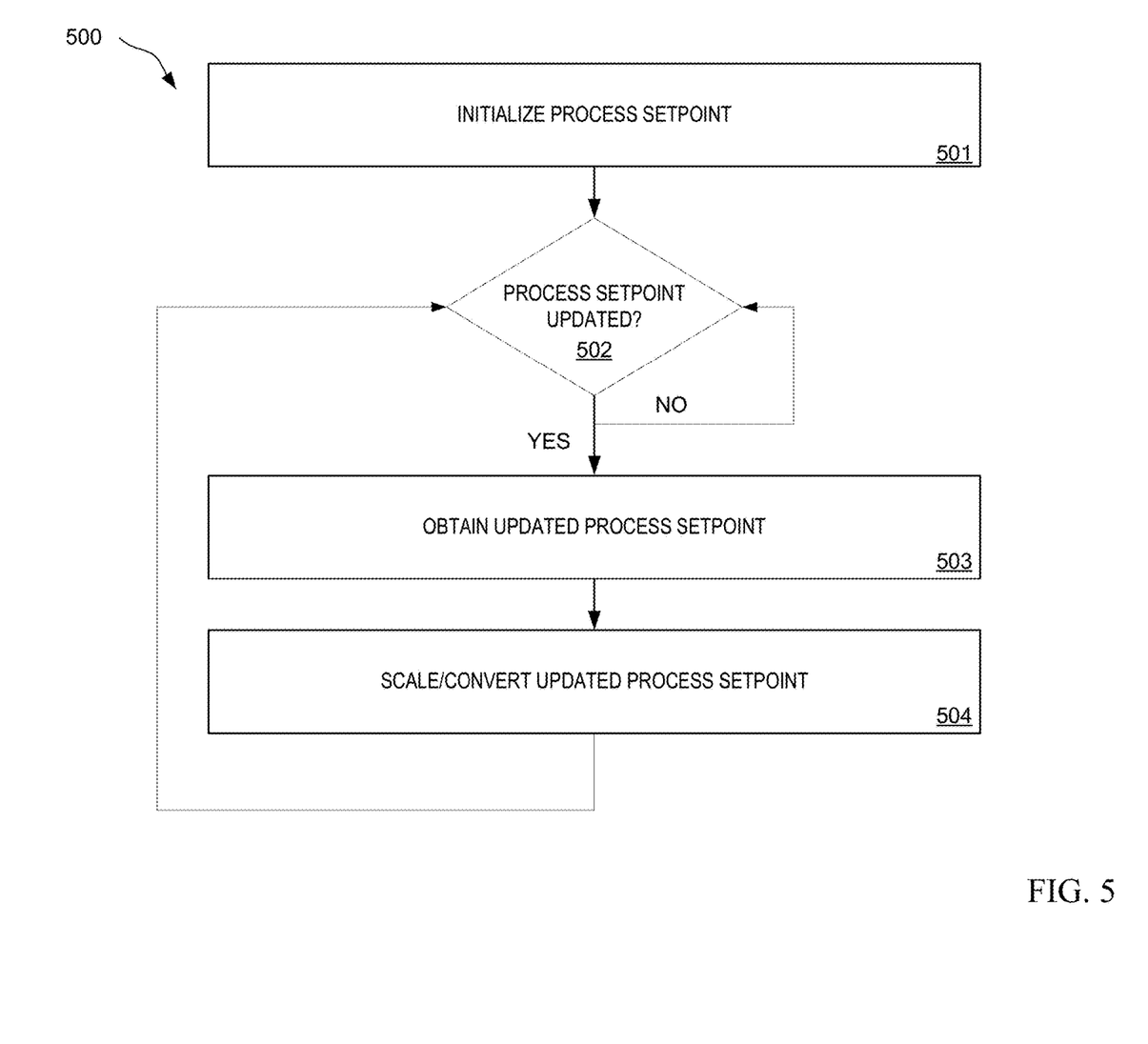
FIG. 5 is an example process flow for autonomous update of a setpoint, according to an embodiment.

FIG. 5 is an example process flow for autonomous update of a setpoint, according to an embodiment. Process 500 can begin by initializing the process set point (501). For example, the process set point can be obtained from a CPU or other peripheral. Process 500 continues by determining if the setpoint is updated (502). If the setpoint is updated, process 500 obtains the updated process setpoint (503) and scales/converts the updated setpoint as required by the process (504). If the setpoint is not updated, process 500 continues the determining step 502 until the setpoint is updated or the APCP is deactivated. In another embodiment, a fixed setpoint can be used and stored in, for example, the APCP or system memory.

Figure 6:
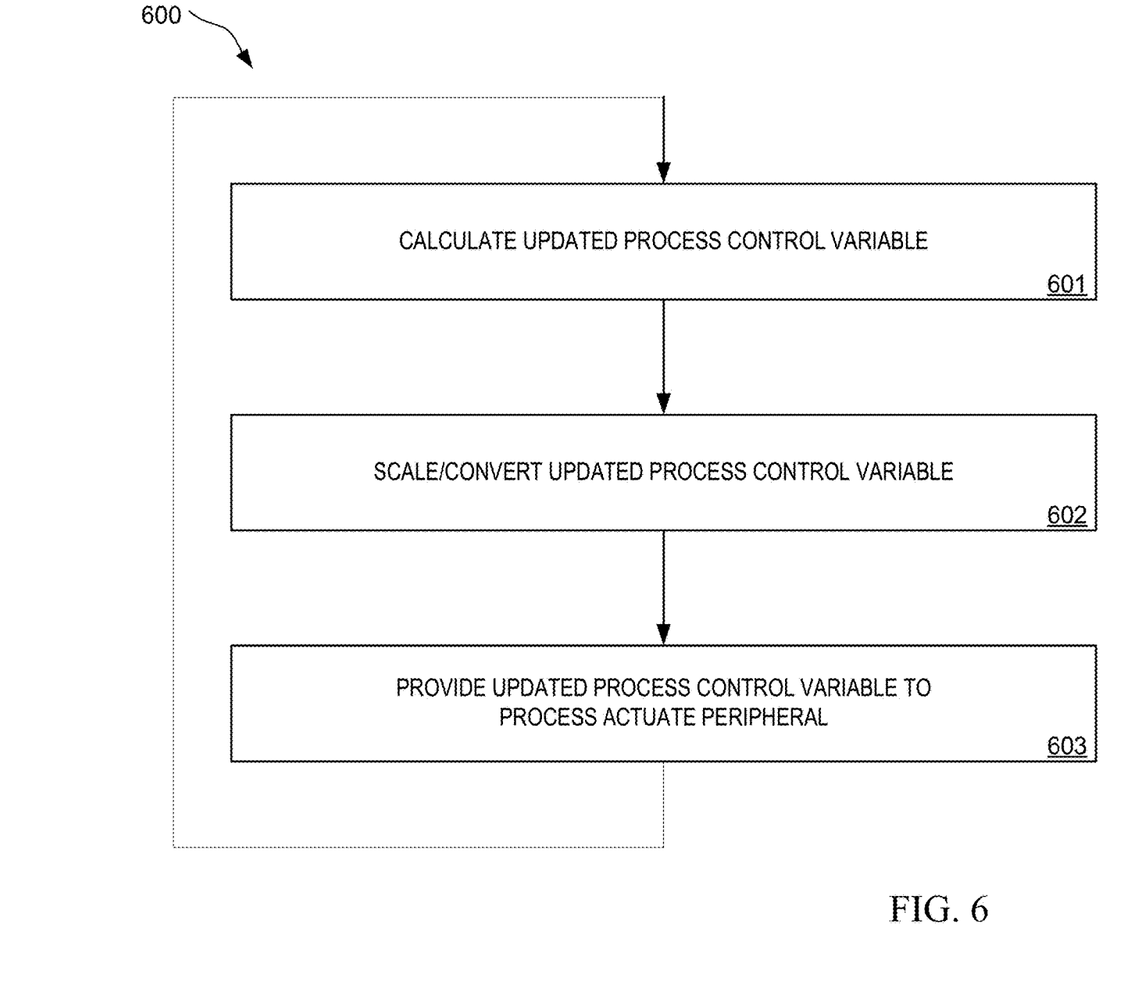
FIG. 6 is an example process flow of a process control loop, according to an embodiment.

FIG. 6 is an example process flow of a control loop, according to an embodiment. Process 600 can begin by calculating an updated control variable (601). For example, the updated control variable can be calculated by a PID processing engine in APCP according to Equation [1]. Process 600 continues by scaling/converting the updated control variable (602) as required by the process (504), and then providing the control variable to a process actuate peripheral (603).

Processes 400, 500 and 600 will now be further illustrated with respect to an example control process for an electric motor coupled to a microcontroller. The electric motor turns a shaft that is connected to fan blades. The speed of rotating shaft coupled to the fan blades is controlled by current provided to the electric motor. The electric motor is coupled to a process monitor peripheral, which in this example is a capture timer module. The capture timer module measures the rotation time of the motor shaft using a sensor (e.g., a hall or optical sensor). The electric motor is also coupled to a process actuate peripheral, which in this example is PWM timer module, which controls, for example, half-bridges in the power stage. In this application, the sensed speed of rotation of the shaft is the process variable and is an analog value, which is autonomously obtained by the APCP from, for example, a register in the capture timer module in response to an event signal from the capture timer module that is received by the APCP on an event channel. The desired speed is the setpoint, which can be a digital value provided to the APCP by a CPU over a system or peripheral bus. The control variable is a digital value output from the APCP, which is sent to the PWM timer module so that the digital value can be converted to an electric current input to the electric motor. The APCP calculates the difference between the sensed speed and the setpoint in the digital domain to obtain the error. The error signals whether the speed of the fan is too fast or too slow and by how much. The APCP calculates how much electric current to supply to the electric motor using a control law.

In an embodiment, the APCP is operable to use a proportional (P) term only to control the electric motor, where the electric motor current is set in proportion to the error. In another embodiment, the APCP is operable to user a proportional term and also an integral term (PI) to accumulate speed error in the past to detect whether the speed of the rotating shaft is settling out too low or too high and to set the electric current in relation to the error and the time for which the error has persisted. In another embodiment, the APCP is operable to use a proportional term and also a derivative term (PD) that considers the rate of change of the error to supply more or less electric current depending on how fast the error is approaching zero. In yet another embodiment, the APCP is operable to use a proportional term, a derivative term and an integral term (PID) that includes all the attributes described above.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller unit (MCU) comprising:
   at least one bus;
   a central processing unit (CPU) coupled to the at least one bus;
   a process monitor peripheral coupled to the at least one bus;
   a process actuate peripheral coupled to the at least one bus;
   an autonomous process control peripheral coupled to the at least one bus, the autonomous process control peripheral operable, without intervention by the CPU, to:
      obtain a first signal indicating that a variable of a process monitored by the process monitor peripheral is available;
      obtain the process variable from the process monitor peripheral;
      update a control variable using a control law based on the process variable; and
      provide the updated control variable to the process actuate peripheral to adjust the process,
   wherein the at least one bus and the CPU are internal to the MCU.

2. The microcontroller unit of claim 1, wherein the process monitor peripheral is a capture timer module.

3. The microcontroller unit of claim 1, wherein the first signal is an event signal obtained from an event channel independent of the at least one bus.

4. The microcontroller unit of claim 1, wherein the control law is a proportional-integral-derivative (PID) control law.

5. The microcontroller unit of claim 1, further comprising:
   obtain a second signal indicating that a setpoint is available;
   obtain the setpoint; and
   update the control variable using a control law and the setpoint; and
   provide the control variable to the process actuate peripheral to adjust the process.

6. The microcontroller unit of claim 1, further comprising:
   generating a notification signal indicating that the control variable is available; and
   providing the notification signal to the process actuate peripheral.

7. The microcontroller unit of claim 1, wherein the process monitor peripheral and the process actuate peripheral are the same peripheral.

8. The microcontroller unit of claim 1, wherein the updated process variable is obtained from system memory coupled to the at least one bus using a direct memory access controller (DMAC) coupled to the at least one bus.

9. The microcontroller unit of claim 1, wherein the autonomous process control peripheral is configured by one or more parameters to implement all or part of the control law.

10. The microcontroller unit of claim 1, wherein the autonomous process control peripheral includes digital signal processing circuitry for updating the control variable in response to an updated process variable.

11. A method performed by a microcontroller unit, the method comprising:
    obtaining, by an autonomous process control peripheral of a microcontroller system and without intervention by a central processing unit (CPU) of the microcontroller system, a first signal indicating that a variable of a process monitored by a process monitor peripheral of the microcontroller unit is available;
    responsive to the first signal, obtaining, by the autonomous process control peripheral controller, the process variable from the process monitor peripheral;
    updating, by the autonomous process control peripheral and based on the process variable, a control variable using a control law; and
    providing, by the autonomous process control peripheral, an updated control variable to a process actuate peripheral of the microcontroller unit for adjusting the process.

12. The method of claim 11, wherein the process monitor peripheral is a capture timer module.

13. The method of claim 11, wherein the control law is a proportional-integral-derivative (PID) control law.

14. The method of claim 11, further comprising:
    obtain a second signal indicating that a setpoint is available;
    obtain the setpoint; and
    update the control variable using a control law and the setpoint; and
    provide the updated control variable to the process actuate peripheral.

15. The method of claim 11, further comprising:
    generating a notification signal indicating that an updated control variable is available; and
    providing the notification signal to the process actuate peripheral.

16. The method of claim 11, wherein the process monitor peripheral and the process actuate peripheral are the same peripheral.

17. The method of claim 11, wherein the process variable is obtained from system memory using a direct memory access controller (DMAC).

18. The method of claim 11, wherein the autonomous process control peripheral is configured by one or more parameters to implement all or part of the control law.

19. The method of claim 11, wherein the autonomous process control peripheral includes digital signal processing circuitry for updating the control variable in response to an updated process variable.

20. A computing apparatus, comprising:
    a processor of a microcontroller;
    a first peripheral, a second peripheral and a third peripheral each of the microcontroller and collectively arranged to perform a control loop responsive to one or more events, the control loop configured to minimize a difference between an observed performance of a monitored process and a desired performance of the monitored process, wherein:

the first peripheral is configured to set a process variable indicative of performance of the monitored process;

the second peripheral is configured to initiate a control action responsive to a control variable; and the third peripheral is configured to set the control variable responsive to a control law and the process variable;

a first bus coupled to the processor, the first peripheral, the second peripheral and the third peripheral; and an event system configured to provide indications of the one or more events to one or more of the first peripheral, second peripheral or third peripheral without intervention by the processor.

\* \* \* \* \*

UNITED STATES PATENT AND TRADEMARK OFFICE
CERTIFICATE OF CORRECTION

PATENT NO. : 10,942,492 B2　　　　　　　　　　　　　　　　　　　　　　　　　Page 1 of 1
APPLICATION NO. : 15/793924
DATED : March 9, 2021
INVENTOR(S) : Jacob Lunn Lassen It is certified that error appears in the above-identified patent and that said Letters Patent is hereby corrected as shown below:

In the Claims

Claim 8,　　Column 7,　　Line 65,　　change "updated process" to --process--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*